(12) United States Patent
Boisvert et al.

(10) Patent No.: US 8,269,359 B2
(45) Date of Patent: Sep. 18, 2012

(54) ELECTRONIC CONTROL FOR A HYDRAULICALLY DRIVEN GENERATOR

(75) Inventors: Mario P. Boisvert, Reed City, MI (US); Thomas Kienitz, Chase, MI (US); John M. Washeleski, Cadillac, MI (US)

(73) Assignee: UUSI, LLC, Reed City, MI (US)

( * ) Notice: Subject to any disclaimer, the term of this patent is extended or adjusted under 35 U.S.C. 154(b) by 516 days.

(21) Appl. No.: 12/623,928

(22) Filed: Nov. 23, 2009

(65) Prior Publication Data

US 2010/0097038 A1    Apr. 22, 2010

Related U.S. Application Data

(63) Continuation-in-part of application No. 12/324,025, filed on Nov. 26, 2008, now Pat. No. 7,759,811, which is a continuation-in-part of application No. 11/275,574, filed on Jan. 17, 2006, now Pat. No. 7,459,800.

(51) Int. Cl.
F03B 13/00 (2006.01)
F03B 13/10 (2006.01)
H02P 9/04 (2006.01)
(52) U.S. Cl. ........................................................ 290/43
(58) Field of Classification Search ............. 290/40 C, 290/29, 1 R, 40 B, 43, 40 R, 4 D
See application file for complete search history.

(56) References Cited

U.S. PATENT DOCUMENTS

| | | | |
|---|---|---|---|
| 2,888,810 A * | 6/1959 | Hann | 62/215 |
| 3,941,016 A | 3/1976 | Will | |
| 4,287,429 A | 9/1981 | Bashnin et al. | |
| 4,754,156 A | 6/1988 | Shiozaki et al. | |
| 4,920,277 A | 4/1990 | Kuwabara et al. | |
| 5,028,221 A | 7/1991 | Malfit | |
| 5,410,943 A | 5/1995 | Kervagoret | |
| 5,421,705 A | 6/1995 | Benckert | |
| 6,394,206 B1 | 5/2002 | Fury | |
| 6,483,198 B2 | 11/2002 | Schmitz et al. | |
| 6,664,651 B1 | 12/2003 | Kotre et al. | |
| 6,677,685 B2 | 1/2004 | Pfleger et al. | |
| 6,781,350 B1 | 8/2004 | Iwatani et al. | |
| 7,053,498 B1 | 5/2006 | Boisvert et al. | |
| 7,268,442 B2 | 9/2007 | Syed et al. | |
| 7,285,869 B2 | 10/2007 | Syed et al. | |
| 7,459,800 B2 | 12/2008 | Boisvert et al. | |
| 2009/0134848 A1 | 5/2009 | Boisvert et al. | |

* cited by examiner

*Primary Examiner* — Javaid Nasri
(74) *Attorney, Agent, or Firm* — Brooks Kushman P.C.

(57) ABSTRACT

Electronic control for a hydraulic system to drive an auxiliary power source is provided, with an application as a system for controlling the operation of a hydraulically driven AC generator. The system includes a hydraulic pump, a hydraulic motor drivably connected to the generator, and a fluid circuit for circulating fluid from the pump to the motor and back. The feedback circuit contains a feedback conduit to feedback the motor. The system also includes a proportional servo control valve assembly for controlling the fluid conduits and a control circuit for controlling the control valve assembly to thereby control the flow of fluid to the motor. Sensors for measuring the operating parameters of the system and an operator interface module are both able to influence the operation of the system.

41 Claims, 6 Drawing Sheets

FIG. 6

ELECTRONIC CONTROL FOR A HYDRAULICALLY DRIVEN GENERATOR

CROSS-REFERENCE TO RELATED APPLICATIONS

This is a continuation-in-part of U.S. application Ser. No. 12/324,025, filed Nov. 26, 2008 now U.S. Pat. No. 7,759,811; which is a continuation-in-part of U.S. application Ser. No. 11/275,574, filed Jan. 17, 2006, now U.S. Pat. No. 7,459,800.

BACKGROUND OF THE INVENTION

1. Field of the Invention

The present invention is directed to an electronic control for hydraulic systems, and more particularly to precision control of hydraulically driven generators for stabilizing frequency and voltage output characteristics.

2. Background Art

Most engine driven vehicles utilize an internal combustion engine as the primary power source for propelling a vehicle. However, numerous modules and devices for the vehicle as well as the engine require electrical power. Typically, a rechargeable battery is provided with the vehicle as a basic power supply. The battery power supply system provides direct current (DC) electrical power for starting the vehicle engine and for operating certain DC compatible electrical loads when the vehicle is not running. The battery is recharged to maintain power by an alternator coupled to and driven by the engine when the vehicle is running. Concurrently, the alternator also provides DC electrical power to the vehicle electrical loads.

With the advent of electronics in today's modern vehicle, ground vehicles, boats and aircraft alike, the amount of electrical loads which require power has significantly increased. Moreover, many various auxiliary electrical loads are dependent upon stable alternating current (AC), for example, rescue and military vehicles having AC powered communications equipment. Additionally, many other vehicles, such as utility and telephone company repair and maintenance vehicles and vehicles providing electrical welding equipment, are increasingly utilizing AC equipment dependent upon clean AC power.

Various systems have been proposed for alleviating the complication of operating both AC and DC powered electrical equipment. One such system involves driving an auxiliary AC generator from the vehicle's engine or principal power plant. This can be accomplished by connecting the generator to a power take off or to any other suitable connection to engine output. While this will indeed operate a generator, variations in engine speed will wreak havoc with characteristics of power output and therefore with equipment which is dependent upon stable voltage and frequency characteristics of electrical power.

Accordingly, various systems have been proposed to control speed of an AC generator. One such system utilizes a hydraulic circuit having a valve for supplying a constant rate of fluid flow to a hydraulic motor. The hydraulic motor in turn drives a generator for supplying AC power to certain AC compatible electrical loads. However, such systems can have difficulty maintaining precise frequency output for controlling the most sensitive AC equipment and are often susceptible to premature mechanical failure.

SUMMARY OF THE INVENTION

Accordingly, it is an aspect of the present invention to provide a hydraulic control system for generating precise electrical output characteristics, particularly frequency output, along with prolonging the life of the system, thus reducing warranty returns and costs associated therewith.

A hydraulic control system for driving an auxiliary power source, located aboard a vehicle having a primary power source, at substantially constant speed despite fluctuations in rotational speed of the primary power source is provided. The system may include a hydraulic pump, a hydraulic motor, a fluid circuit, a control valve assembly, and a control circuit. The control valve assembly may be proportional and/or compensation or a combination of both. The hydraulic pump may be drivably connectable to the primary power source and can have an inlet for receiving fluid for pumping, an outlet for discharging pumped fluid under pressure, and a pump control displacement inlet for receiving fluid for control of pump displacement. The hydraulic motor may be drivably connectable to the auxiliary power source and can have an inlet for receiving fluid under pressure and an outlet for discharging spent fluid. The fluid circuit may include a supply conduit for conducting fluid discharged by the pump to the motor, a return conduit for returning fluid discharged by the motor to the pump, and a feedback conduit directly connected to the pump displacement control inlet.

The control valve assembly can be disposed serially or parallel with respect to the supply conduit and interposed between the outlet of the pump and both the feedback conduit and the inlet of the motor. The control valve assembly may have a housing including a valve chamber with a valve disposed therein and a solenoid drivably connectable to the valve for selectively moving the valve incrementally within the valve chamber between an opened position and a closed position.

The control circuit is in communication with the control valve assembly for controlling the control valve assembly and hence fluid flow to both of the motor and the pump displacement control inlet.

The control circuit may comprise a sub-circuit for providing electrical communication to manually control the proportional control valve assembly by means of input from an interface module for displaying a user alert of temperature differential, aiding in recommended system installation to specifications.

The control circuit may be in electrical communication with the valve assembly for controlling the valve assembly and hence the fluid flow within a first fluid passage of the valve assembly to the motor supply conduit and a second fluid passage within the valve assembly to the feedback conduit. Further, the control circuit may include a sensor electrically coupled to the auxiliary power source for determining output frequency of the auxiliary power source. A reference signal generator for generating a reference signal indicative of a predetermined output frequency may also be provided. Additionally, the control circuit can include a comparing sub-circuit for comparing sensed output frequency with the reference signal, and for generating a control signal controlling the valve assembly such that the supply of fluid conducted to the supply conduit is sufficient to maintain desired output frequency.

Moreover, the control circuit of the hydraulic control system may further include a temperature sensor disposed in the fluid circuit for sensing hydraulic fluid temperature. A system controller having a fluid pre-heating sub-circuit may be provided for generating a control signal controlling the valve assembly such that fluid is restricted from the hydraulic motor entirely until safe fluid temperature is obtained. Further, the system controller may further include a power ramping sub-circuit for generating a control signal controlling the valve assembly when sufficient fluid temperature is obtained such that power is supplied gradually to the hydraulic motor. The control circuit may include a temperature sensor disposed in the air intake for sensing ambient air temperature to be used in communication with the interface module for displaying a user alert of the temperature differential, aiding in recommended system installation to specifications.

Furthermore, the system controller may include an over-temperature shutdown sub-circuit for generating a control signal controlling the valve assembly when fluid temperature becomes too hot for safe operation such that fluid is restricted from the hydraulic motor thereby shutting down the auxiliary power source. Additionally, the control circuit can be equipped with an emergency override accessible by an operator for instructing the system controller to continue system operation when unsafe operating conditions exist. The system controller may include electrical communication for providing automatic shut down of user prioritized specific vehicle component AC power loads to alleviate overload or over-temperature conditions for maintaining safe operation of the power system. This communication can also alert the user of shut down requirements. The control circuit may include a sub-circuit for providing electrical communication to manually control a cooling fan by means of input from the interface module and can command the fan on and off through the user interface. The control circuit may further include a pressure sensor for determining system over-pressure, causing system operation to shutdown to prevent damage to hydraulic components.

It is another aspect of the present invention to provide a hydraulic control system that senses fluid pressure in the fluid circuit and automatically engages the auxiliary electrical system to power certain electrical loads, provided safe operating temperatures are obtained.

It is another aspect of the present invention to include an interface communication protocol, capable of communicating with a standard vehicle bus interface enabling the displaying of real time system operating characteristics to an operator.

Accordingly, the control circuit of the hydraulic control system may further include a pressure sensor for determining sufficient hydraulic pressure for commencing system operation. The pressure sensor can cause system operation to begin when hydraulic pressure is sufficient, and can, correspondingly, cause system operation to shut down when hydraulic pressure is deficient.

Yet another aspect of the present invention is to control operation of the hydraulic circuit to perform under safe operating conditions.

Therefore, a method, according to the present invention, for operating a hydraulic control system may include sensing hydraulic fluid temperature in a fluid circuit, warming hydraulic fluid by circulating the fluid through portions of the fluid circuit and restricting flow through the hydraulic motor, if sensed fluid temperature is below safe operating temperature, and supplying hydraulic fluid slowly through to the hydraulic motor once hydraulic fluid reaches safe operating temperature to gradually bring the motor up to desired speed so that full power operation can commence.

Warming the hydraulic fluid may involve maintaining closed an electronically controlled hydraulic proportional valve disposed within the fluid circuit such that fluid is restricted from the hydraulic motor. Supplying hydraulic fluid slowly to the hydraulic motor may involve gradually closing an electronically controlled hydraulic proportional valve disposed within the fluid circuit such that fluid is gradually conducted through a motor supply conduit in fluid communication with the hydraulic motor in order to gradually apply power to the motor.

Moreover, the method for operating the hydraulic control system may further include sensing hydraulic motor output characteristics and apportioning fluid flow to the hydraulic motor in order to maintain constant motor output characteristics. Sensing hydraulic motor output characteristics may involve sensing electrical output characteristics of a generator driven by the hydraulic motor. Apportioning may involve comparing sensed output characteristics with predetermined output characteristics, generating a control signal based on the comparison, and selectively controlling an electronically controlled hydraulic proportional valve to move incrementally within a valve chamber such that fluid is proportionally restricted from a motor supply conduit in fluid communication with the hydraulic motor.

Further, the method of operating the hydraulic control system may include preventing over-temperature damage to the hydraulic system when sensed fluid temperature exceeds safe operating temperature. Preventing over-temperature damage may involve annunciating the existence of over-temperature conditions to an operator when a first high temperature is obtained, triggering a timer to begin counting down a specified time when a second high temperature is obtained, and restricting all fluid flow to the motor when the timer has expired. Restricting all fluid flow to the motor can involve closing an electronically controlled hydraulic proportional valve disposed within the fluid circuit such that fluid is entirely restricted from the supply conduit. Additionally, the method may include overriding the restricting step upon receipt of an emergency override instruction from an operator to prevent shutdown and keep the system operating.

Furthermore, the method of operating the hydraulic control system may also include sensing fluid pressure in the fluid circuit, commencing operation of an auxiliary power source if sensed fluid pressure is sufficient by controlling a hydraulic proportional valve to meter fluid to the hydraulic motor, which drives the auxiliary power source, and ceasing operation of an auxiliary power source if sensed fluid pressure is deficient by fully closing the proportional valve to restrict all fluid flow to the motor.

Furthermore, the hydraulic control system and generator can be arranged into a modular enclosure. This enclosure may direct cooling air in an upward or downward direction to provide efficient cooling and to reduce mounting space requirements. This modular enclosure could open grate mounted on the top surface of the unit that serves to allow air to exhaust in addition to providing a safe, non-slip walking surface. This modular enclosure may include a baffle to separate the cooler intake air from mixing with the warmer exhausted air. The fluid circuit supply and discharge hydraulic conduit can be disposed to exit the system in a generally downward direction in relation to the system mounting orientation to provide reduced mounting space requirements.

Still another aspect of the present invention is to provide annunciation of auxiliary power source output characteristics.

Still yet a further aspect of the present invention is that acceleration of the auxiliary power source from the stopped condition, as well as cold temperature condition, be gradual.

These and other aspects, objects, features and advantages of the present invention will become more clearly understood and appreciated from a review of the following detailed description of the preferred embodiments and appended claims, and by reference to the accompanying drawings.

BRIEF DESCRIPTION OF THE DRAWINGS

The features of the present invention which are believed to be novel are set forth with particularity in the appended claims. The present invention, both as to its organization and manner of operation, together with further object and advantages thereof, may best be understood with reference to the following description, taken in connection with the accompanying drawings in which:

DETAILED DESCRIPTION OF THE PREFERRED EMBODIMENT(S)

As required, detailed embodiments of the present invention are disclosed herein. However, it is to be understood that the disclosed embodiments are merely exemplary of an invention that may be embodied in various and alternative forms. Therefore, specific functional details disclosed herein are not to be interpreted as limiting, but merely as a representative basis for the claims and/or as a representative basis for teaching one skilled in the art to variously employ the present invention.

Figure 1:
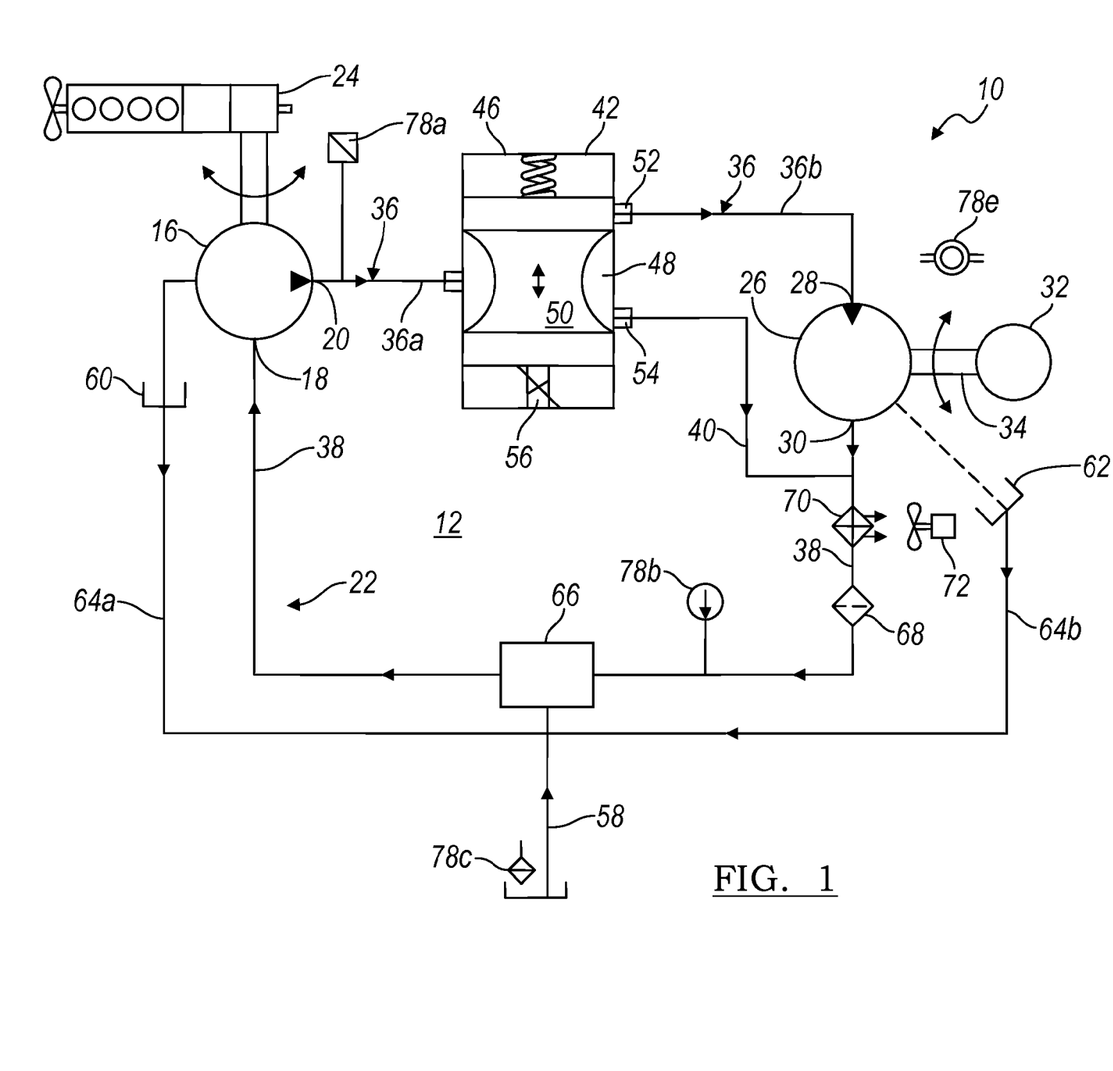
FIG. 1 is a schematic diagram of a hydraulic circuit exhibited in an exemplary control system according to an aspect of the present invention.
Figure 2:
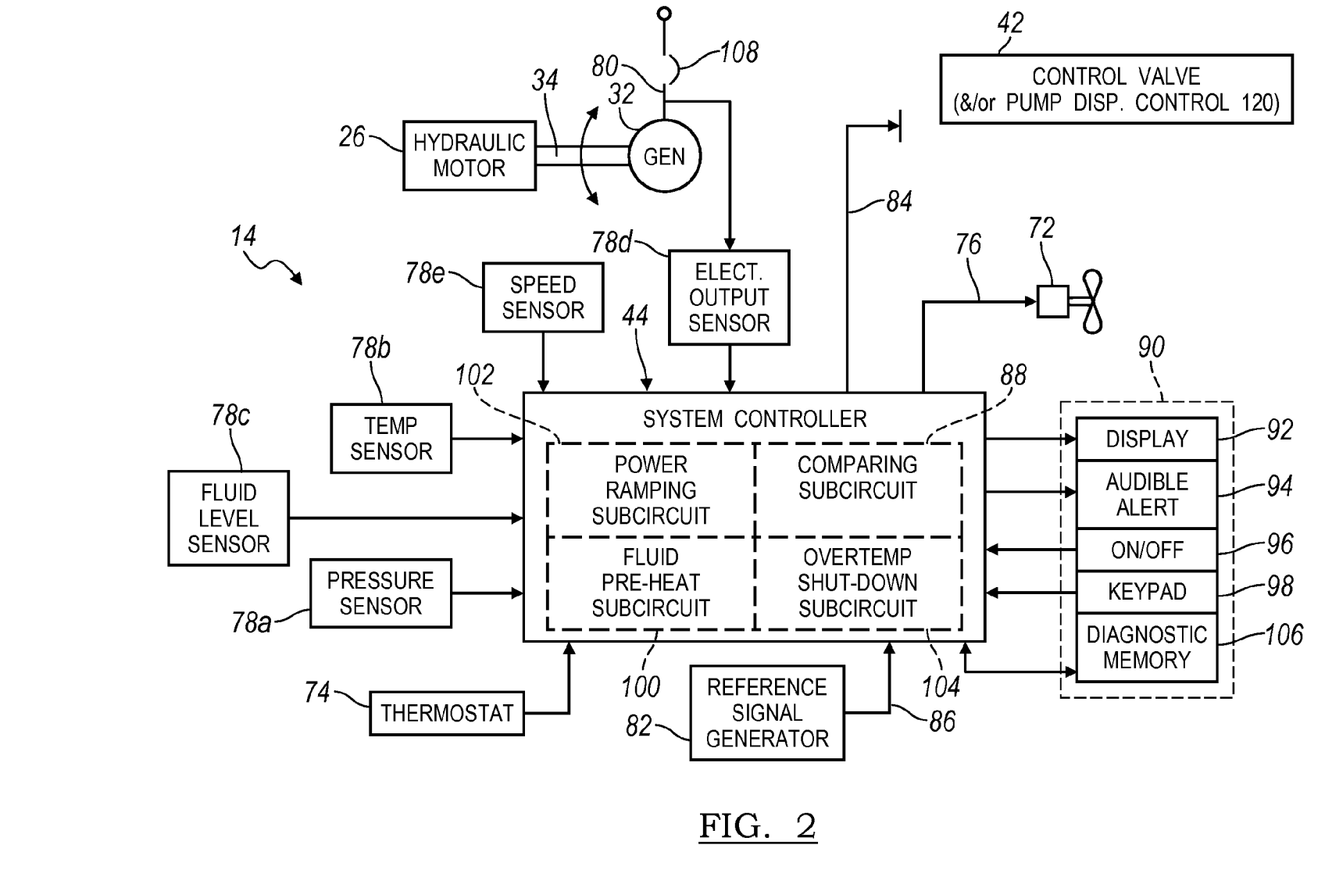
FIG. 2 is a schematic diagram of an alternate hydraulic circuit exhibited in an exemplary control system according to an aspect of the present invention.

A hydraulic control system 10, according to an aspect of the present invention, is illustrated in FIGS. 1 and 2. FIG. 1 generally depicts a hydraulic circuit 12 for hydraulic control system 10, while FIG. 2 generally depicts a control circuit 14 for hydraulic control system 10.

Referring first to FIG. 1, hydraulic circuit 12 of system 10 is powered by a hydraulic pump 16, having an inlet 18 for receiving fluid for pumping and an outlet 20 for discharging pumped fluid under pressure. Hydraulic pump 16 can be a variable displacement type pump for pumping pressurized fluid throughout a fluid circuit 22. Hydraulic pump 16 can be driven by a primary power source 24, such as a vehicle power take-off (PTO), belt drive, gasoline engine, diesel engine, or any similar input. A hydraulic motor 26, having an inlet 28 for receiving fluid under pressure and an outlet 30 for discharging spent fluid, can be disposed within hydraulic circuit 12, as shown. Hydraulic motor 26 drives an auxiliary power source 32, which provides electrical or mechanical power to vehicle loads or devices (not shown). For example, auxiliary power source 32 can be an AC generator, a mechanical drive system, or other source requiring constant rotational speed. Hydraulic motor 26 can be drivably connected to auxiliary power source 32 through a shaft 34 (as shown in FIGS. 1 and 2), or a belt or other means of power transmission (not illustrated). Moreover, hydraulic motor 26 can be a fixed displacement gear type motor, vane type motor, piston type motor, or the like.

Fluid circuit 22 can include a supply conduit 36, a return conduit 38, and a feedback conduit 40. Supply conduit 36 can be divided into at least two sections—a valve supply conduit 36a and a motor supply conduit 36b. Supply conduit 36 conducts fluid discharged by pump 16 to motor 26, while return conduit 38 returns fluid discharged by motor 26 to pump 16. Feedback conduit 40, meanwhile, can be disposed in fluid circuit 22 to conduct fluid discharged by pump 16 directly to return conduit 38, bypassing motor 26, where the fluid is subsequently returned to pump 16.

System 10 includes a proportional control valve assembly 42, such as an electro-hydraulic control valve assembly, controlled by a system controller 44 (shown in FIG. 2). Control valve assembly 42 can be disposed serially or parallel with respect to supply conduit 36 such that control valve assembly 42 is interposed between outlet 20 of pump 16 and inlet 28 of motor 26. Control valve assembly 42 may include a housing 46 generally enclosing a valve chamber 48. A valve 50, which shuttles back and forth between an opened position and a closed position, may be disposed within valve chamber 48. Control valve assembly 42 may further include a first fluid passage 52 and a second fluid passage 54. Further, control valve assembly 42 can be disposed within hydraulic circuit 12 such that first fluid passage 52 is in fluid communication with valve chamber 48 and motor supply conduit 36b, while feedback conduit 40 is in fluid communication with a pump displacement control 54. A solenoid 56 or other electronic or electro-mechanical device can be drivably connected to valve 50 for selectively moving valve 50 incrementally within valve chamber 48 from the opened position to the closed position. Solenoid 56 can be in electrical communication with system controller 44, which drives solenoid 56. Accordingly, system controller 44 can communicate with control valve assembly 42 such that valve 50 selectively closes and opens first fluid passage 52 and second fluid passage 54, thereby dividing fluid flow proportionally therebetween.

As valve 50 divides the flow of hydraulic fluid between first fluid passage 52 and the feedback for pump displacement control 54, the fluid can be correspondingly directed to motor supply conduit 36b and feedback conduit 40. Fluid directed to motor supply conduit 36b may be supplied to, and discharged by, motor 26 for powering auxiliary power source 32 before returning to pump 16 via return conduit 38. Fluid directed to feedback conduit 40 can feedback motor 26 completely as it is steered immediately to return conduit 38, without being supplied to motor 26, for restoring to pump 16.

Figure 3:
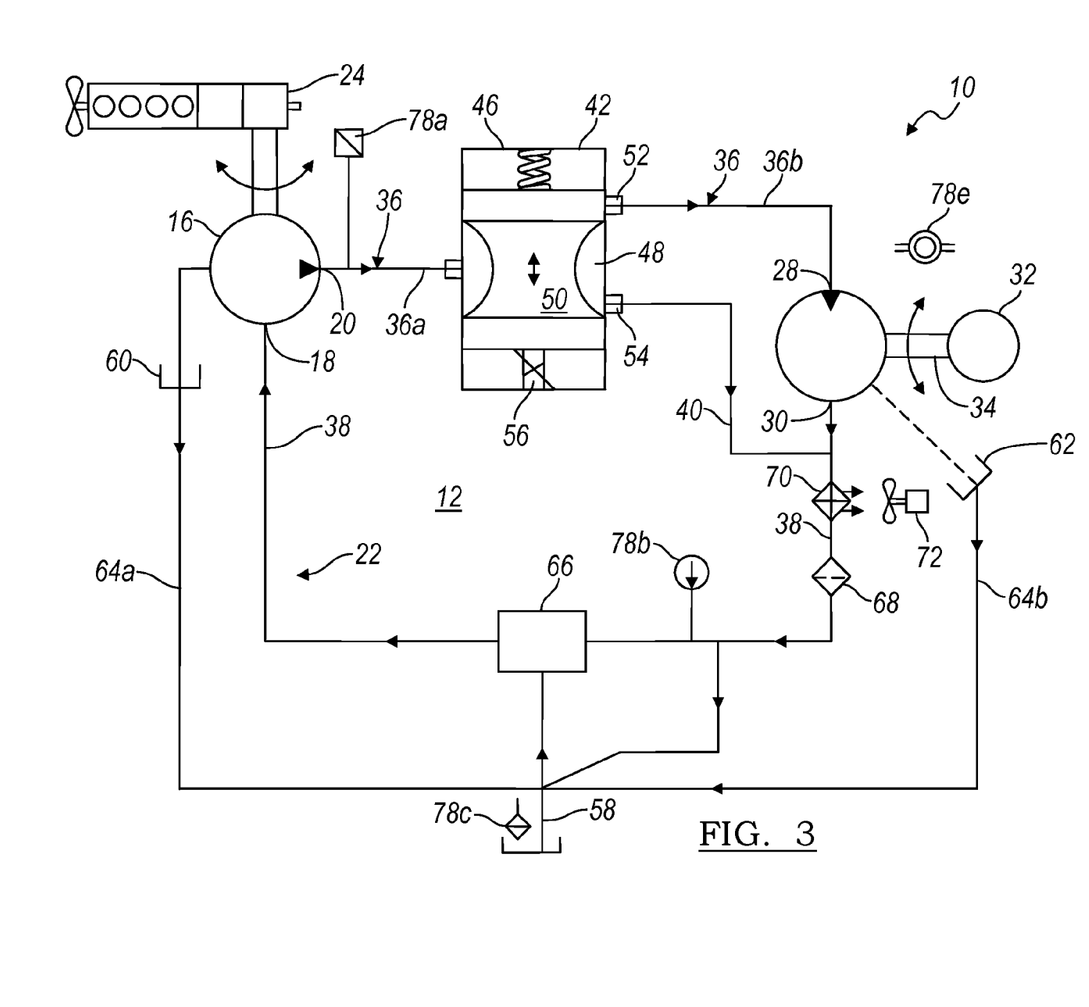
FIG. 3 is a schematic diagram of a second alternative embodiment of a hydraulically driven generator and the associated control circuit in accordance with another aspect of the present invention.

Optionally, hydraulic circuit 12 may include a fluid reservoir 58 and a pump case drain 60 disposed at pump 16, a motor case drain 62 disposed at motor 26, or both. Fluid reservoir 58 can be in fluid communication with fluid circuit 22 and maintains hydraulic fluid on reserve that can be introduced to pump 16 via return conduit 38. In an embodiment of the present invention, possible case drain flow from pump 16 and motor 26 can be directed back to fluid reservoir 58 through drain conduits 64a-b (as illustrated in FIG. 3). Fluid flow in return conduit 38 can be directed through a venturi boost 66, where fluid from fluid reservoir 58 may be drawn into return conduit 38 to replace that lost from the case drain flow, and supplied back to pump 16. Alternatively, drain conduits 64a-b can be disposed in fluid circuit 22 such that case drain flow can be pulled directly to return conduit 38 by venturi boost 66, without first being directed to fluid reservoir 58 (as shown in FIG. 1).

Additionally, hydraulic circuit 12 may also include a fluid filter 68 and a fluid cooler 70. Fluid filter 68 and fluid cooler 70 are preferably disposed serially or parallel with respect to return conduit 38. However, it is to be understood that fluid filter 68 and fluid cooler 70 can be disposed anywhere within fluid circuit 22 without departing from the scope of the present invention. Impurities introduced into the hydraulic fluid as it gets cycled through fluid circuit 22 can be filtered by fluid filter 68. Fluid cooler 70, on the other hand, can cool fluid that passes there through. Accordingly, fluid cooler 70 may include a heat exchanger (not separately shown) for dissipating heat to ambient air, an electrically operated fan 72 disposed adjacent the heat exchanger for forcing ambient air through the heat exchanger, and a thermostat 74 (not separately shown in FIG. 1) which controls fan operation when fluid contained within fluid cooler 70 exceeds a predetermined temperature. Thermostat 74 can directly control fan 72, or, alternatively, thermostat 74 can control fan operation through system controller 44. For example, thermostat 74 and fan 72 may be in electrical communication with system controller 44. System controller 44 may receive temperature readings of the fluid in fluid cooler 70 from thermostat 74. Correspondingly, system controller 44 can operate fan 72 by transmitting a fan control signal 76 to fan 72 when fluid contained within fluid cooler 70 exceeds the predetermined temperature.

System 10, according to an aspect of the present invention, may also include a pressure sensor 78a, a temperature sensor 78b, a fluid level sensor 78c, an electrical output 78d (FIG. 2 only), and a speed sensor 78e, collectively referred to as system control sensors 78. Each of control sensors 78 can be provided as part of control circuit 14, shown in FIG. 2, and are configured to provide control inputs to system controller 44. Control sensors 78 can be deployed throughout system 10 to measure system vitals and assure auxiliary power source 32 is driven at constant speeds.

Referring back to FIG. 1, pressure sensor 78a can be disposed along valve supply conduit 36a proximate pump 16 to sense hydraulic pressure. However, it is to be understood that there are many other locations in fluid circuit 22 for positioning pressure sensor 78a so long as it can accurately sense that pump 16 is operating. Similarly, temperature sensor 78b can be disposed along fluid circuit 22 to monitor hydraulic fluid temperature. Temperature sensor 78b can be separate from thermostat 74 and thus provide separate input to system controller 44, or, alternatively, the temperature sensor can be the same as the thermostat. Fluid level sensor 78c can be disposed within fluid reservoir 58 to monitor the level of hydraulic fluid within reservoir 58. If the fluid level becomes low, system controller 44 may announce a tell-tale alarm to the operator. If the fluid level becomes extremely low, system controller 44 may cause system 10 to shut down entirely to prevent damage to pump 16.

In an embodiment of the present invention, auxiliary power source 32 can be an AC generator. Accordingly, electrical output 78d can be a current sensor, voltage sensor, or both for monitoring the generator's operating characteristics, including current, voltage, and frequency. Electrical output 78d can be connected to output conductors 80 of generator 32 to sense the generator operating parameters. Alternatively, speed sensor 78e may be provided to monitor rotational speed of motor 26 and shaft 34, by sensing each revolution of shaft 34, in order to provide controlled input to system controller 44 relating to operation of hydraulic motor 26.

Referring now to FIG. 2, control circuit 14 will be described in further detail with reference to an AC generator as driven auxiliary power source 32, although other applications referred to in the detailed description are also possible. As previously described, control circuit 14 may include system controller 44 and one or more of control sensors 78, as well as a reference signal generator 82. System controller 44 can be a programmable controller having a microprocessor (not separately shown) that implements control algorithms for the control of the generator output, namely voltage and frequency. System controller 44 controls the generator output by applying a control output signal 84 to proportional control valve assembly 42, directing valve assembly 42 to meter fluid, and hence power, to motor 26 for driving the generator. System controller 44 varies the power supplied to hydraulic motor 26 through the use of control output signal 84. Accordingly, control output signal 84 can be a pulse-width modulated voltage waveform or a variable DC output voltage applied to solenoid 56 of valve assembly 42.

Vehicles today often rely on sensitive and delicate electronics equipment, wherein only the cleanest of power is acceptable for operation. Very little variance in the output frequency of an AC generator is tolerable in order to operate various devices such as computers and communications equipment. Merely close frequency output in relation to desired frequency output is not good enough. Accordingly, it may be desirable to compare actual frequency with a predetermined frequency, rather than merely relying on sensed motor speed as an indirect method of determining the generator's output characteristics. Of course, it is to be understood that sensing rotational speed of motor 26 may be adequate in certain applications. Nonetheless, in an embodiment of the present invention, electrical output 78d can be electrically coupled to generator 32. Reference signal generator 82 can be in electrical communication with system controller 44 and generates a reference signal 86 indicative of the predetermined output frequency. System controller 44 may include a comparing sub-circuit 88 that implements control algorithms for comparing sensed output frequency with reference signal 86. Comparing sub-circuit 88 can then generate and transmit control output signals for controlling valve assembly 42 such that the supply of fluid conducted to motor 26 be sufficient to maintain desired generator output frequency.

System controller 44, constructed in accordance with an exemplary embodiment of the present invention, may also implement additional control algorithms for the electrical or mechanical system's output functions in response to load variations, physical changes in the electrical or mechanical system's operating environment or equipment, and communications from the user or other electronic modules. As the load on the electrical or mechanical system is increased or decreased, or the hydraulic fluid viscosity changes due to temperature fluctuations and such, or the operating characteristics of pump 16, motor 26, or valve assembly 42 change due to ambient conditions or wear, system controller 44 can further adjust outputs to maintain consistent operation of the electrical or mechanical system.

Control circuit 14 may further include an operator interface module 90 enabling an operator of system 10 to communicate with system controller 44 through a bi-directional asynchronous serial communications interface. Interface module 90 can display system operating parameters through an information display 92. As non-limiting examples, the operating parameters displayed may include output voltage, frequency, current, hydraulic fluid temperature, total operating hours, and the like. Interface module 90 can also display or announce alarm conditions or faults detected by system controller 44 and permit the operator to interact with system controller 44 and influence the operation of auxiliary power source 32. The alarm conditions can be announced by an audible alert 94 included in interface module 90. The operator may also influence the configuration of system controller 44. For example, the operator may turn hydraulically powered system 10 on or off through an ON/OFF switch 96. Moreover, the operator may configure system controller 44 to automatically turn auxiliary power source 32 on when sufficient hydraulic pressure is detected. Further, the operator can instruct system controller 44 to purge air from the hydraulic lines, and configure the maximum expected output values to be controlled by the system. The operator communicates with system controller 44 through a keypad 98 disposed in interface module 90. Furthermore, multiple interface modules may be linked together to add multiple operator interfaces if desired.

When the electrical or mechanical system to be driven is idle or shut down, valve 50 can be normally fully open, directing all fluid flow into feedback conduit 40, and depriving motor 26 of power. At the operator's request through interface module 90, power can be metered to motor 26 by incrementally closing valve 50, which begins diverting some proportional amount of fluid flow to motor 26. The more valve 50 is closed, the more power can be provided to motor 26, thereby activating the electrical or mechanical system.

Alternatively, the application of hydraulic pressure to fluid circuit 22 may be interpreted by system controller 44 as a command to commence electrical or mechanical system operation. The operator may wish to configure system controller 44 to automatically power auxiliary power source 32 when pump 16 is operating. If pressure sufficient for system operation is detected by pressure sensor 78a, system operation can automatically commence without further instruction from the operator. On the other hand, if the hydraulic pressure falls below that required for system operation, system controller 44 can direct proportional valve 50 to open fully, diverting all fluid flow into feedback conduit 40, thereby shutting down motor operation.

System controller 44 may further include a fluid pre-heating sub-circuit 100. If temperature sensor 78b detects that hydraulic fluid in system 10 is too cold for normal operation, system controller 44 can implement fluid pre-heating sub-circuit 100 to warm the fluid to a safe operating temperature. Fluid pre-heating sub-circuit 100 can generate control output signals for controlling proportional valve assembly 42 such that fluid is restricted from hydraulic motor 26 entirely until safe fluid operating temperature is obtained, avoiding damage to the mechanical components. System controller 44 can hold proportional valve 50 fully open to circulate the hydraulic fluid through feedback conduit 40. Normal mechanical friction will warm the fluid until it reaches a first predetermined temperature, at which point proportional valve 50 can be opened only enough to pass the warming fluid slowly through motor 26. Normal mechanical friction will warm the fluid further until it reaches a second predetermined temperature, at which point full power operation can commence.

The application of fluid pre-heating sub-circuit 100 can be incredibly advantageous in extremely low temperatures where the hydraulic fluid can partially congeal. If fluid were permitted to pass through motor 26 immediately, prior to frictional warming through feedback conduit 40, lumps of congealed fluid can momentarily obstruct the motor gears causing motor 26 to briefly decelerate and then accelerate. The deceleration and acceleration caused by lumps in the fluid passing through the motor gears occurs almost instantaneously, resulting in large voltage spikes at the output of auxiliary power source 32 (in the case of a generator). The duration of the voltage spike is very abrupt and the magnitude of the voltage spike can be sufficient to damage various electrical loads. Fluid pre-heat sub-circuit 100 substantially minimizes this occurrence reducing warranty claims and associated costs, while greatly increasing customer satisfaction and good will.

Once pressure and temperature are sufficient, full system operation can begin. In order to bring system 10 up to power, system controller 44 may utilize a power ramping sub-circuit 102. Power ramping sub-circuit 102 can enable system controller 44 to slowly close proportional valve 50 so as to gradually apply power to hydraulic motor 26. This gradual application of power allows system 10 to gently overcome inertial effects, greatly reducing wear and increasing system component lifetimes.

Figure 4:
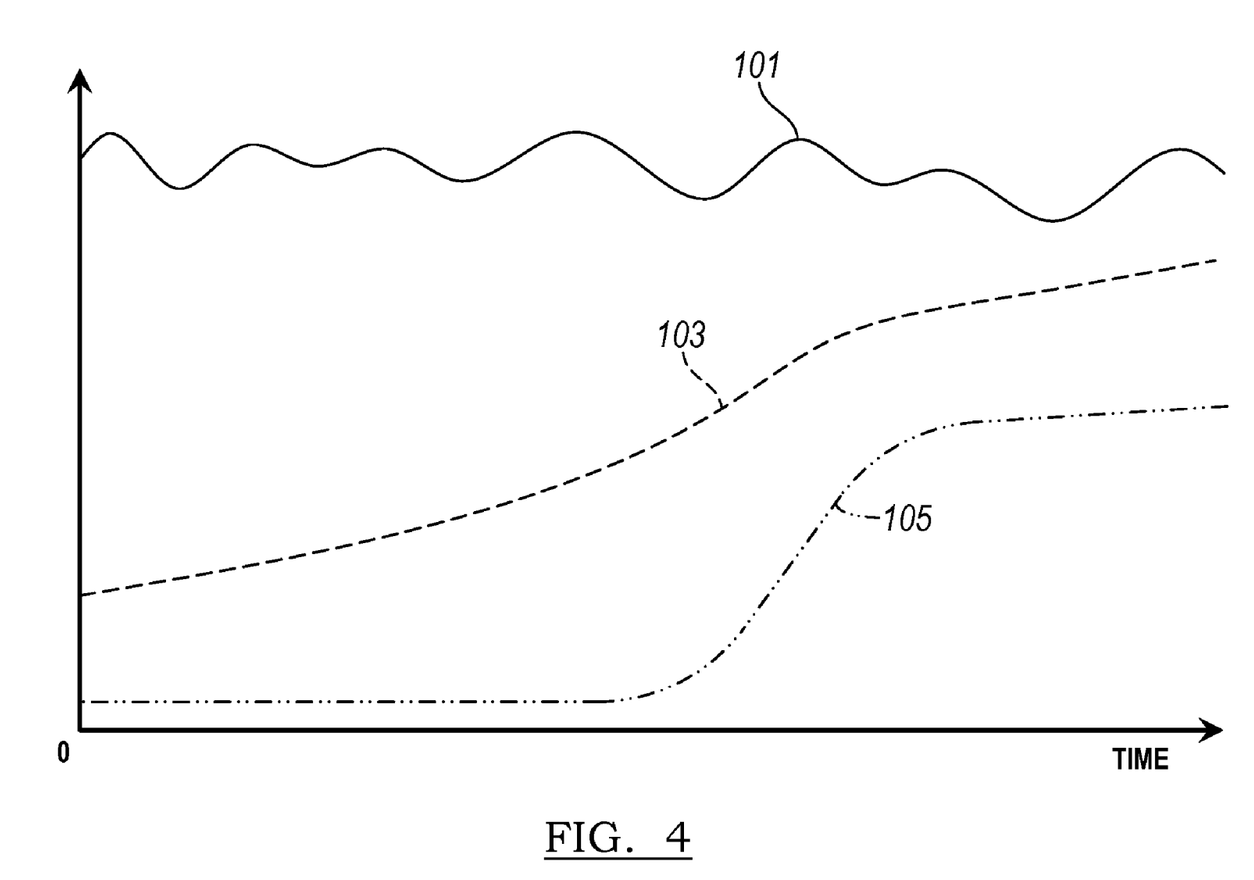
FIG. 4 is a graph generally displaying system characteristics during cold start operation according to an aspect of the present invention.

With reference now to FIG. 4, a graphical representation of cold start operation parameters of the system, utilizing fluid pre-heating sub-circuit 100 and power ramping sub-circuit 102, is illustrated. Pump speed 101 generally depicts revolutions per minute (RPMs) of hydraulic pump 16 over time at initial system cold temperature start-up. Pump speed 101 can fluctuate over time as the vehicle engine 24 speed fluctuates. Fluid temperature 103 generally depicts temperature of the fluid in fluid circuit 22 during cold start operation. At cold start, hydraulic fluid can bypass motor 26 until it warms to a sufficient temperature, at which point fluid is slowly diverted to motor 26 to gradually supply power to the system. During this ramp-up, fluid temperature 103 can increase further permitting full system operation to begin. Motor speed 105 generally depicts operation of motor 26 (in RPMs) during cold start. Motor 26 can get little or no power, while the fluid warms as it circulates through feedback conduit 40. Once a desired temperature is obtained, motor speed 105 slowly ramps up as fluid is gradually supplied to motor 26. Once full system operation commences, motor speed 105 remains substantially constant, despite fluctuations in engine speed and hence pump speed 101.

Further, system controller 44 may include an over-temperature shut-down sub-circuit. When the temperature of the hydraulic fluid exceeds safe operating conditions, over-temperature shut-down sub-circuit 104 can notify the operator of the electrical or mechanical system that excessive temperatures are being detected, and action may be required to prevent damage to system 10. When the temperature exceeds yet another temperature threshold, over-temperature shut-down sub-circuit 104 can start an internal timer. If the timer expires, proportional valve 50 may be fully opened by over-temperature shut-down sub-circuit 104, bypassing all fluid flow and shutting down hydraulic system 10 unless the operator issues an emergency override instruction through keypad 98 to prevent the shutdown and keep the electrical or mechanical system operating.

System controller 44 may also have the ability to record all abnormal conditions and faults to a diagnostic memory 106. The faults can be retrieved from diagnostic memory 106 by the operator and displayed by interface module 90 to evaluate the conditions seen by system 10 and assist in any necessary troubleshooting. Recorded conditions may include, but are not limited to, valve voltage faults, valve current faults, over current faults, current sensing faults, temperature sensing faults, ground faults, number of over temperature overrides, fan faults, voltage sensing faults, hours run with over temperature, highest recorded frequency, highest recorded voltage, highest measured current, highest measured temperature, hours run with over current, hours on oil filter, calibration values, maximum current values, and total hours.

Yet another advantage of hydraulic control system 10, according to the present invention is that it can be a self-contained system that can also be readily retrofit to a vehicle having a power take of, engine driven belt drive, or any other power supply source. Moreover, system 10 may include a circuit breaker 108 as yet another protective feature. Circuit breaker 108 may be located in series with output conductors 80 connected to output terminals of generator 32. Circuit breaker 108 can operate conventionally by opening an external circuit (not shown), which is connected to conductors 80 to conduct electrical power to powered equipment.

A general overview of the operation of the hydraulic system electronic control, according to a certain embodiment of the present invention, is provided below. System controller 44 can sense adequate operating pressure in fluid circuit 22. If system controller 44 does not automatically interpret sufficient pressure as a command to commence operation, it can wait to receive a command signal from an input, operator, or other electronic module to activate the hydraulically powered mechanical or electrical system. System controller 44 can then check the status and values of the control inputs to ensure operation will be safe and effective. If the hydraulic fluid temperature is too low, fluid pre-heat sub-circuit 100 can cause the fluid to warm to safe operating temperatures. System controller 44 can then gradually apply power to hydraulic motor 26 by slowly closing proportional valve 50, according to power ramping sub-circuit 102. Appropriate control signals can be applied by system controller 44 to outputs in response to the control inputs to achieve the desired control and function of system 10. If the hydraulic fluid temperature becomes too high for safe operation, over-temperature shutdown sub-circuit 104 can be implemented to shut down the operation of the electrical or mechanical system. The system's operating parameters may be sent via serial communications using a proprietary protocol to operator interface module 90 or other electronic module. If a command is received from the operator or other electronic module to cease operation, or the hydraulic pressure falls below that required for operation, system controller 44 can shut down the electrical or mechanical system by fully opening valve 50, bypassing all hydraulic fluid flow to motor 26.

Figure 5:
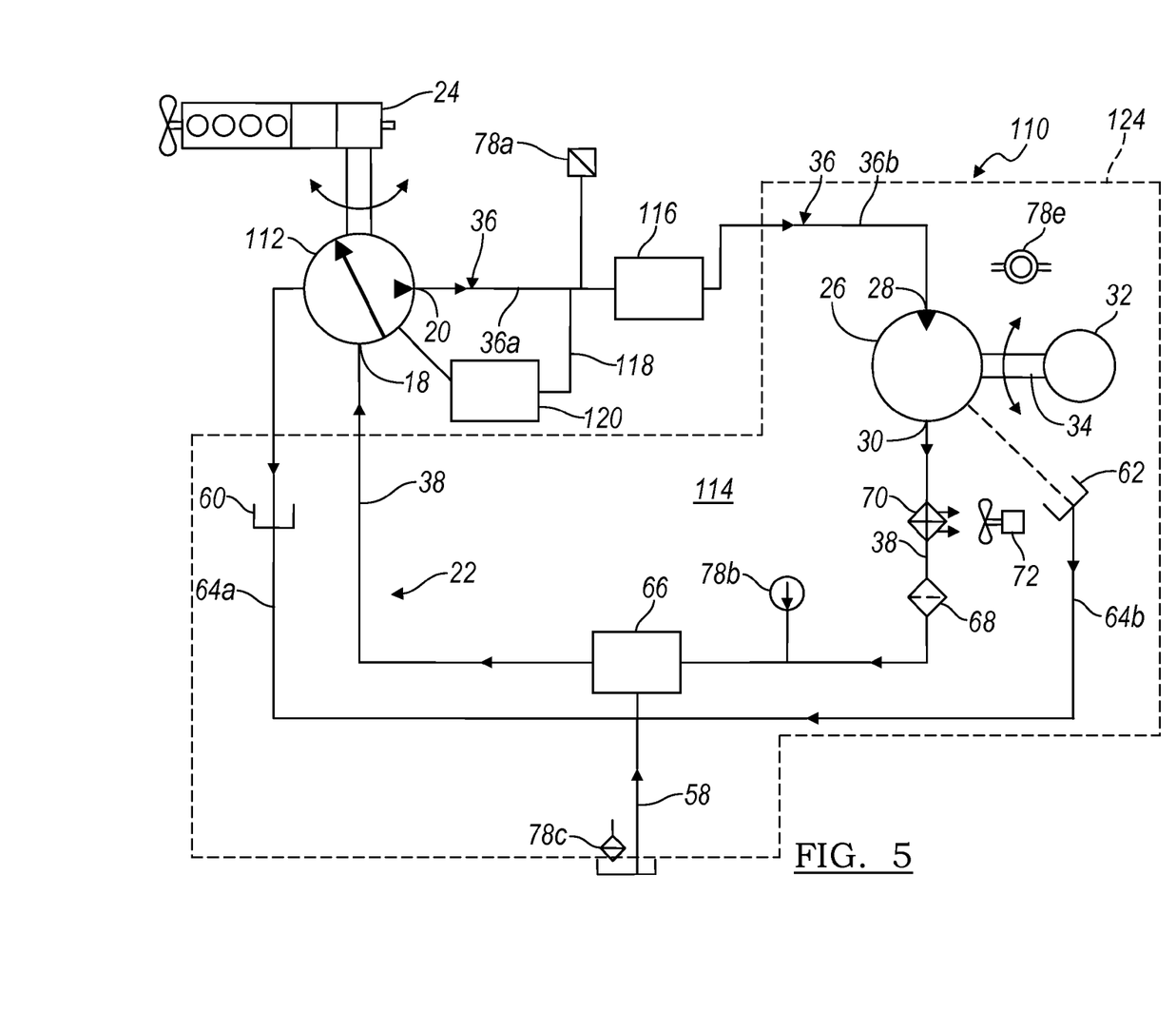
FIG. 5 is a schematic diagram of a third alternative embodiment of a hydraulically driven generator and the associated control circuit in accordance with another aspect of the present invention.

A third embodiment of the present invention is illustrated in FIG. 5. A hydraulically driven generator system 110 is similar to system 10 described with reference to FIG. 1, however rather than using a control valve assemble 42 to regulate the amount of the output of pump 16 that passes through hydraulic motor 26, a variable displacement pump 112 is utilized which has a external input which enables the control system to vary the pump displacement to achieve the desired flow rate needed for hydraulic motor 36. Hydraulic control circuit 114 of the FIG. 5 embodiment is otherwise generally similar to control system 12 utilized in the FIG. 1 embodiment and like components function in a similar manner as described previously.

In operation the output from pump 112 provides hydraulic fluid to hydraulic motor 26. As previously described, control valve 42 is utilized in the FIG. 1 embodiment is no longer required provided the pump minimum displacement is sufficiently low. If the minimum pump displacement is substantial, i.e., over 20% of maximum pump displacement, a control valve 42 as previously described can be added in order to deactivate motor 26 at desired times. When control valve 42 is not used an optional pressure regulator 116 can be provided to maintain desired minimum back pressure on the outlet of pump 112 which is sufficient to operate pump displacement control 120 which is supplied with hydraulic fluid via line 118.

A pump displacement control 120 cooperates with pump 112 to vary the displacement of the pump as needed. Pump displacement control 120 can have a hydraulic output or alternatively a mechanical output as dictated by the pump design. Pump displacement control 120 varies the pump displacement as a function of a control signal 84 received from system controller 44 illustrated in FIG. 2. Pump displacement control 120 is hydraulically powered, alternatively an electrically operated actuator such as a stepper motor could be used to vary pump displacement. Hydraulically driven generator system 110 of the FIG. 5 embodiment is designed to have a reduced pumping losses and associated energy consumption when compared to system 10 of FIG. 1 in which high pressure fluid is routinely bypassed about the hydraulic motor at high pump speed conditions.

Figure 6:
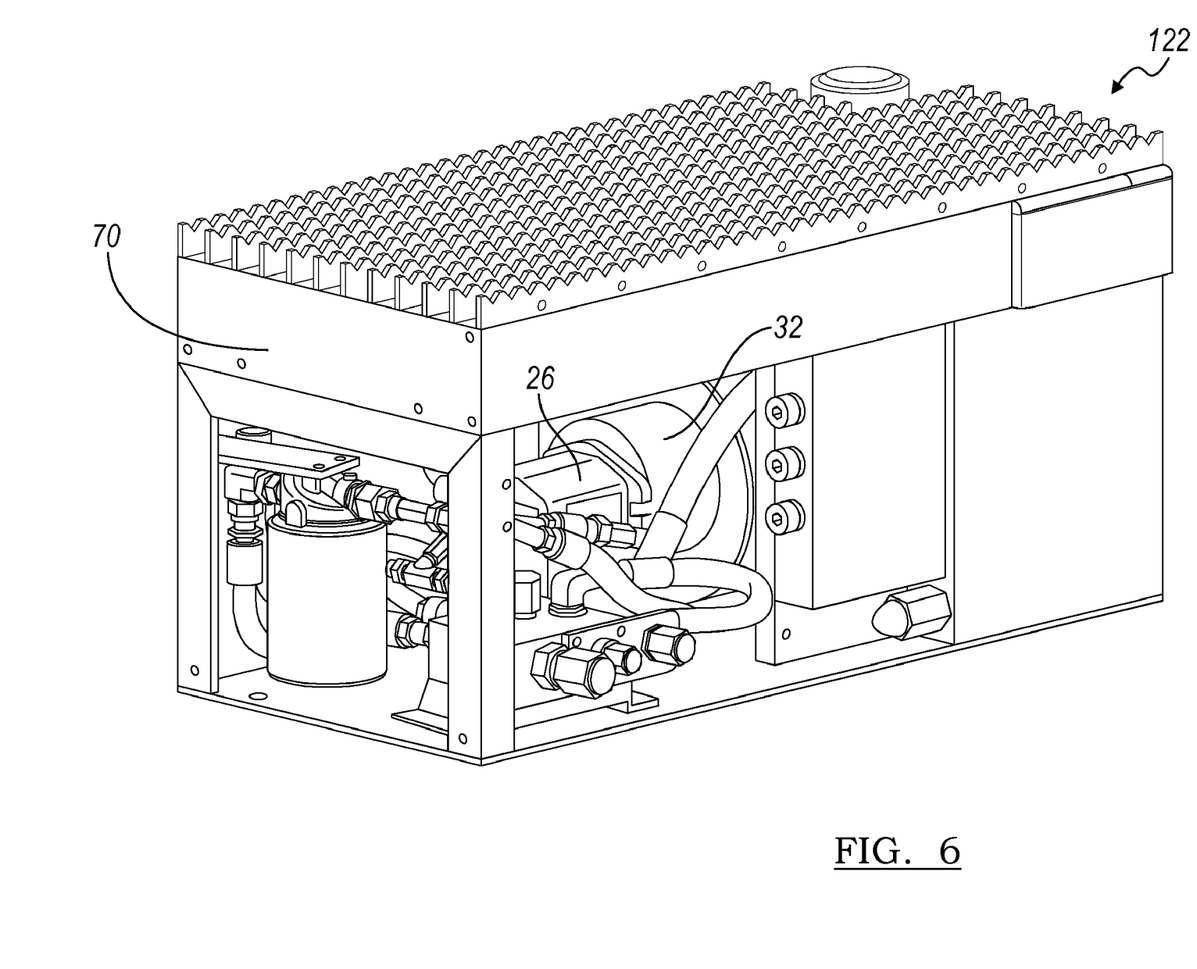
FIG. 6 is an illustration of auxiliary module unit suitable for mounting a hydraulic driven generator of the present invention to the exterior of a motor vehicle.

FIG. 6 illustrates a preferred packaging module 122 for mounting the hydraulically driven generator of the present invention to a motor vehicle. Typically, there this insufficient space in the vehicle engine compartment or adjacent the vehicle drive train to mount a hydraulic motor and associated generator of the present invention inside the vehicle body. Module assembly 122 is suitable for attachment to the exterior of a vehicle. A large portion of the hydraulically driven generator system can be mounted within module assembly 122. The portion of the system suitable for mounting outside module 122 is illustrated in phantom outline in FIG. 5 by reference number 124. Preferably variable displacement pump 112 and associated pump displacement control 120 will be mounted directly to the power source such as internal combustion engine or a power takeoff associated with an internal combustion engine of the vehicle. Motor 26 and generator 32 are mounted externally in module 122 as are the other components identified in region 124 of FIG. 5.

Module 122 when mounted external to the vehicle not only eliminates space problems but further facilitates dissipating any excess heat generated by hydraulic pump 112, motor 26, and generator 32 via a fluid cooler 70. Module 122 can be provided with an open grate top 126 as illustrated which allows air to freely circulate through the module and provide a non-slip working surface for the system user. Preferably, module 122 will be provided with a cooling fan 72 forcing cooling air about the system components.

As such, the hydraulic control system and generator can be arranged into a modular enclosure. This enclosure could direct cooling air through a cooler in an upward or downward direction to provide efficient cooling and to reduce mounting space requirements. Grate top 126 mounted on the top surface of the enclosure serves to allow air to exhaust in addition to providing a safe, non-slip walking surface. The modular enclosure can include a baffle to separate the cooler intake air from mixing with the warmer exhausted air. The fluid circuit supply and discharge hydraulic conduits can be disposed to exit the system in a generally downward direction in relation to the system mounting orientation to provide reduced mounting space requirements.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A hydraulic system for driving an auxiliary power source, located aboard a vehicle having a primary power source, at a substantially constant speed despite fluctuations in rotational speed of the primary power source, the system comprising:

a hydraulic pump drivably connectable to the primary power source, the pump having an inlet for receiving fluid, an outlet for discharging fluid under pressure, and a pump displacement control inlet for receiving fluid to control displacement of the pump;

a hydraulic motor drivably connectable to an auxiliary power source, the motor having an inlet for receiving fluid under pressure and an outlet for discharging spent fluid;

a fluid circuit including a supply conduit for conducting fluid discharged by the pump to the motor, a return conduit for returning fluid discharged by the motor to the pump, and a feedback conduit directly connected to the pump displacement control inlet;

a control valve assembly interposed between the outlet of the pump and both the inlet of the motor and the feedback conduit, the control valve assembly having a housing including a valve chamber with a valve disposed therein, a solenoid drivably connectable to the valve for selecting moving the valve within the valve chamber between an opened position and a closed position; and a control circuit in communication with the control valve assembly for controlling the control valve assembly and hence fluid flow to both of the motor and the pump displacement control inlet.

2. The system of claim 1 wherein the control circuit comprises:

an output sensor coupled to the auxiliary power source for determining output frequency of the auxiliary power source;

a reference signal generator for generating a reference signal indicative of a desired output frequency; and a comparing sub-circuit for comparing the sensed output frequency with the reference signal and for generating a control signal controlling the control valve assembly such that supply of fluid to the motor is sufficient for the auxiliary power source to maintain the desired output frequency.

3. The system of claim 1 wherein the control circuit comprises:

a speed sensor for determining rotational speed of the motor;

a reference signal generator for generating a reference signal indicative of a desired rotational speed; and a comparing sub-circuit for comparing sensed rotational speed of the motor with the reference signal and for generating a control signal controlling the control valve assembly such that supply of fluid to the motor is sufficient for the motor to maintain the desired rotational speed.

4. The system of claim 1 wherein:

the control valve assembly is an electro-hydraulic servo control valve assembly.

5. The system of claim 1 wherein:

the control circuit comprises a pressure sensor for determining hydraulic pressure of the fluid, wherein the control circuit controls the control valve assembly to begin system operation when hydraulic pressure is sufficient and to shut down system operation when hydraulic pressure is deficient.

6. The system of claim 1 wherein the control circuit comprises:

a temperature sensor disposed in the fluid circuit for sensing temperature of the fluid; and a system controller having a fluid pre-heating sub-circuit for generating a control signal controlling the control valve assembly such that fluid is restricted entirely from the motor until safe fluid temperature is obtained.

7. The system of claim 6 wherein:

the system controller of the control circuit further comprises a power ramping sub-circuit for generating a control signal controlling the control valve assembly when sufficient fluid temperature is obtained such that fluid is supplied gradually to the motor thereby gradually powering the motor.

8. The system of claim 6 wherein:

the system controller of the control circuit further comprises an over temperature shutdown sub-circuit for generating a control signal controlling the control valve assembly when the fluid temperature becomes too hot for safe operation such that fluid is restricted from the motor thereby shutting down the auxiliary power source.

9. The system of claim 8 wherein:

the control circuit further comprises an emergency override accessible by an operator for instructing the system controller to continue system operation when unsafe operating conditions exist.

10. The system of claim 1 further comprising:

an interface module having a display in communication with the control circuit for displaying real time system operating characteristics to an operator.

11. The system of claim 10 further comprising:

a diagnostic memory in communication with the control circuit to record abnormal operating conditions and faults for subsequent retrieval by an operator via the display.

12. The system of claim 10 wherein:

the interface module is operable to display fault and alarm conditions.

13. The system of claim 1 wherein:

the fluid circuit further comprises a fluid reservoir;

wherein the control circuit comprises a fluid level sensor disposed in the fluid reservoir for generating a fluid level fault when the fluid level falls below a first minimum fluid level and for generating a control signal shutting down the system when the fluid level falls below a second minimum level.

14. The system of claim 1 wherein:

the fluid circuit further comprises a fluid filter disposed serially with respect to the return conduit.

15. The system of claim 1 wherein the fluid circuit further comprises:

a fluid cooler disposed serially with respect to the return conduit;

an electrically operated fan disposed adjacent the fluid cooler to pass ambient air through the fluid cooler; and a thermostat disposed proximate the fluid cooler to operate the fan when fluid contained within the fluid cooler attains a temperature exceeding a predetermined temperature.

16. The system of claim 15 wherein:

the fluid circuit further comprises a fluid filter disposed serially with respect to the return conduit and a fluid reservoir;

wherein the system further comprises a housing enclosing the motor, the control valve assembly, the fluid cooler, the fan, the fluid filter, and the fluid reservoir whereby the motor, the control valve assembly, the fluid cooler, the fan, the fluid filter, and the fluid reservoir are installable as a unit on the chassis of the vehicle.

17. The system of claim 16 wherein:

the fluid cooler and the fan are disposed in an orientation such to direct exhausted air upward to provide reduced space for mounting adjacent to side walls of the housing thereby taking advantage of rising heat tending not to re-circulate back into the housing resulting in cooling efficiency.

18. The system of claim 16 wherein:
the fluid cooler and the fan are disposed in an orientation such to direct exhausted air downward to provide reduced space for mounting adjacent to side walls of the housing thereby providing cooling efficiency by drawing cooler overhead air into the system and exhausting air into lower vehicle space heatable by the operation of other equipment.

19. The system of claim 16 wherein:
the housing comprises a closed tolerance enclosure interposed between the fluid cooler and the fan for providing a generally evenly distributable air flow from the fan through the fluid cooler.

20. The system of claim 15 wherein:
the control circuit comprises a sub-circuit for providing electrical communication to manually control the fan by input from an interface module.

21. The system of claim 20 wherein:
manual control of the fan is used to troubleshoot system installation by commanding the fan to be on or off as desired.

22. The system of claim 1 wherein:
the auxiliary power source is a generator.

23. The system of claim 22 wherein the control circuit comprises:
an output sensor coupled to the generator for determining output voltage of the generator;
a reference signal provider for providing a reference signal indicative of a desired output voltage; and
a comparing sub-circuit for comparing sensed output voltage of the generator and the desired output voltage and for generating a control signal controlling the control valve assembly such that supply of fluid to the motor is sufficient for the generator to maintain the desired output voltage.

24. The system of claim 22 wherein:
the generator has output conductors and a circuit breaker for opening a circuit connected to the output conductors.

25. The system of claim 1 wherein:
the fluid circuit further comprises a fluid reservoir and a venturi boost for drawing fluid from the fluid reservoir into the fluid circuit.

26. The system of claim 1 wherein:
the control circuit comprises electrical communication for providing automatic shut down of user prioritized specific vehicle component AC power loads to alleviate overload or over-temperature conditions for maintaining safe operation of the auxiliary power source.

27. The system of claim 26 wherein:
the control circuit receives feedback from an over-temperature sensor for communicating the need for shutting down vehicle AC components.

28. The system of claim 26 wherein:
the control circuit further comprises electrical communication alerting a user that vehicle component AC power loads previously shut down are ready for restarting as a result of determined safer temperature conditions.

29. The system of claim 1 wherein:
the control circuit comprises a temperature sensor disposed in an air intake of the primary power source for sensing ambient temperature to be used in communication with an interface module for displaying a user alert of temperature differential.

30. The system of claim 1 wherein:
the control circuit comprises a sub-circuit for providing electrical communication to manually control the control valve assembly by input from an interface module.

31. The system of claim 30 wherein:
manual control of the control valve assembly to command the valve to be fully opened or closed enables troubleshoot system installation.

32. A method for operating a hydraulic system, the method comprising:
sensing temperature of hydraulic fluid in a fluid circuit;
if the temperature of the fluid is below a safe operating temperature, then warming the fluid by circulating the fluid through portions of the fluid circuit while restricting the fluid from the fluid circuit to a hydraulic motor; and
incrementally supplying fluid from the fluid circuit to the motor once the temperature of the fluid reaches the safe operating temperature in order to bring the motor up to a desired speed so that full power operation can commence;
wherein incrementally supplying fluid from the fluid circuit to the motor includes incrementally closing a hydraulic proportional valve disposed within the fluid circuit such that fluid is gradually conducted from a motor supply conduit of the fluid circuit in fluid communication with the motor in order to gradually supply power to the motor.

33. The method of claim 32 wherein:
warming the fluid includes maintaining closed the proportional valve such that fluid is entirely restricted from the fluid circuit to the motor.

34. A method for operating a hydraulic system, the method comprising:
sensing temperature of hydraulic fluid in a fluid circuit;
if the temperature of the fluid is below a safe operating temperature, then warming the fluid by circulating the fluid through portions of the fluid circuit;
apportioning fluid from the fluid circuit to a hydraulic motor once the temperature of the fluid reaches the safe operating temperature in order to bring the motor up to a desired speed so that full power operation can commence; and
sensing output characteristics of the motor;
wherein apportioning fluid from the fluid circuit to the motor includes comparing sensed motor output characteristics with predetermined output characteristics and selectively controlling a hydraulic proportional valve disposed in the fluid circuit to move incrementally such that fluid is proportionally restricted from the fluid circuit to the motor.

35. The method of claim 34 further comprising:
preventing over-temperature damage to the hydraulic system when the temperature of the fluid exceeds safe operating temperature.

36. The method of claim 35 wherein preventing over-temperature damage comprises:
annunciating existence of over-temperature condition to an operator when the temperature of the fluid obtains a first high temperature;
triggering a timer to begin counting down a specified time when the temperature of the fluid obtains a higher second high temperature; and
restricting all fluid from the fluid circuit to the motor when the timer has expired.

37. The method of claim 36 wherein:
restricting all fluid from the fluid circuit to the motor includes closing the proportional valve such that fluid is blocked from the fluid circuit to the motor.

38. The method of claim 36 further comprising:
overriding the restricting step upon receipt of an emergency override instruction from an operator to prevent shutdown and keep the hydraulic system running.

39. The method of claim 34 further comprising:
sensing pressure of the fluid in the fluid circuit;
commencing operation of an auxiliary power source if the pressure of the fluid is sufficient by controlling the hydraulic proportional valve to meter fluid from the fluid circuit to the motor in order for the motor to drive an auxiliary power source coupled to the motor; and
ceasing operation of the auxiliary power source if the pressure of the fluid is deficient by opening the proportional valve to feedback all fluid flow from the fluid circuit to the motor.

40. A method for controlling a hydraulic system driven by an engine onboard a vehicle for supplying stable AC power despite fluctuations in engine speed, the method comprising:
sensing pressure of fluid in a fluid circuit;
sensing temperature of the fluid;
commencing operation of an auxiliary power source if the pressure and temperature of the fluid are sufficient;
ceasing operation of the auxiliary power source if at least one of the pressure and temperature of the fluid is deficient by fully opening a hydraulic proportional valve disposed in the fluid circuit to feedback all fluid flow from the fluid circuit to a hydraulic motor coupled to the auxiliary power source;
warming the fluid by circulating the fluid through the fluid circuit while restricting the fluid to the motor, if the temperature of the fluid is below a safe operating temperature;
supplying the fluid gradually from the fluid circuit to the motor once the temperature of the fluid reaches the safe operating temperature in order to gradually bring the motor up to a desired speed such that full operation can commence;
sensing output characteristics of the motor; and
apportioning fluid flow from the fluid circuit to the motor in order to maintain constant motor output characteristics.

41. The method of claim 40 further comprising:
preventing over-temperature damage to the hydraulic system when the temperature of the fluid exceeds the safe operating temperature.

\* \* \* \* \*